(12) United States Patent
Hardy

(10) Patent No.: US 6,438,601 B1
(45) Date of Patent: Aug. 20, 2002

(54) METHOD AND SYSTEM FOR USING CALLER PAYS SERVICE FOR SINGLE USE AND SHORT TERM ACCESS TO INTERNET SUBSCRIPTION SERVICES

(75) Inventor: William C. Hardy, Dallas, TX (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/420,656

(22) Filed: Oct. 19, 1999

(51) Int. Cl.[7] .................................................. H04L 9/32
(52) U.S. Cl. ........................ 709/229; 709/217; 705/53; 705/40
(58) Field of Search ............................... 702/78; 705/40, 705/53, 34, 77, 79; 709/217, 229, 200–203, 218; 379/112, 114, 127; 713/182–184, 201, 202

(56) References Cited

U.S. PATENT DOCUMENTS 5,729,594 A * 3/1998 Klingman ................ 379/93.12
5,745,556 A * 4/1998 Ronen ........................ 379/127
5,949,875 A * 9/1999 Walker et al. ................. 702/78

FOREIGN PATENT DOCUMENTS

EP 926611 A2 * 6/1999

OTHER PUBLICATIONS

Margulies, "IVR meets the Internet", Teleconnect, vol. 14, No. 9, pp. 41–47, Sep. 1996.*

* cited by examiner

Primary Examiner—Zarni Maung
Assistant Examiner—Wen Tai Lin

(57) ABSTRACT

Internet users may utilize a method and system for collecting small access fees for one-time/limited time access to fee for access web sites by capitalizing on the capabilities afforded by the combination of caller pays telephone service and intelligent network services that implement the voice response units for toll free service.

11 Claims, 3 Drawing Sheets

METHOD AND SYSTEM FOR USING CALLER PAYS SERVICE FOR SINGLE USE AND SHORT TERM ACCESS TO INTERNET SUBSCRIPTION SERVICES

BACKGROUND OF THE INVENTION

1. Field of the Invention

The present invention relates generally to a telecommunications system, and more particularly to using the 900-service telecommunications infrastructure to provide single-use and short term access to fee for access Internet sites.

2. Discussion of the Related Art

Some Internet Web sites, such as those for reference materials, e.g., Physicians Desk Reference, stock and investments news letters, e.g., TheStreet.com, and some newspapers, e.g., the Wall Street Journal, are intended to produce revenue in the form of charges for access to the site. Today such access charges are typically collected through a subscription process, whereby the person desiring access completes a registration form, provides a credit card number to which the access price for some period of time is charged, and receives in return an identification number/password that can be used to access the Web site. While this subscription system for charging for access is workable for individuals who expect to have continuing needs for access to a particular web site, it has certain drawbacks.

Granting access by subscription only is analogous to requiring individuals to take out a year's subscription to a magazine rather than paying the single copy price to satisfy their interest in a particular article that has attracted their attention. The requirement to subscribe to a particular web site similarly creates a barrier to visitation by casual users who would be willing to pay for particular items of interest, but cannot justify the cost of subscribing to the service as the cost for acquisition for that one item of information. Just as a subscription requirement would eliminate newsstand sales of magazines, the subscription mechanism for web sites puts off a whole body of potential users who might use the site as a source of a particular article, piece of information or graphic.

Further, the use of a credit card as the medium of payment of small charges is not cost-effective. Even if the subscription mechanism were set up for separate prices of one-time/limited time entry to web sites, the reasonable prices that might be charged for such access would, in general, be too small for credit card handling. From the users' point of view, for example, there is a very large psychological barrier to giving out the information of a credit card with a $10,000 limit to an unfamiliar destination to cover a fifty cent fee. From the point of view of the web site owner, the handling overhead for hundreds of small charges is certainly daunting, if not prohibitive.

It is therefore highly desirable to have an alternate system for collecting fees for access to web sites that would circumvent the inherent limitations in the subscription mechanism. Such a system would both expand the potential market for web sites that are currently accessed only by subscription to include what might be a very large body of casual users who are willing to pay smaller prices for one-time access, and open up a whole new market of "admission price" web sites, which are accessed by paying a small access fee for each visit to the site.

One such solution, U.S. Pat. No. 5,737,414 entitled "900 NUMBER BILLING AND COLLECTION SYSTEM AND METHOD FOR ON-LINE COMPUTER SERVICES" proposes several methods to enable an on-line service provider to collect revenue from a 900-toll billing network though an access management computer. Several conceptual methods are provided, but these methods do not necessarily represent the optimum methods of connectivity for the existing 900-service infrastructure.

SUMMARY OF THE INVENTION

The method and system for utilizing 900 service for single use and short term access to internet subscription services of the present invention overcomes the limitations of the related art discussed above.

In accordance with one aspect, the present invention is directed to a method for using an existing caller pays service telecommunications infrastructure to provide single use and short term access to fee for access Internet web sites. The method comprising registering one or more fee for access Internet web sites with an access code handling system to generate and communicate user ID and password pairs to be used to validate payment for access to each fee for access Internet web site, provisioning one or more caller pays numbers for each registered fee for access Internet web site, and registering each provisioned number with one or more intelligent network service switches to which the provisioned numbers would be routed, routing any user originated calls by a user who desires to access the one or more fee for access Internet sites to both an automated voice response unit and a caller pays service billing system, providing the user with a session user ID via a display generated by the fee for access Internet web site, communicating via the caller pays telecommunications infrastructure a password associated with the session user ID and service option for the registered fee for access Internet web site via the automated voice response unit, and billing the user for the selected option with the caller pays service billing network.

In accordance with another aspect, the present invention is directed to a system for implementing an existing caller pays telecommunications infrastructure to provide single use and short term access to fee for access Internet web sites. The system comprises an access code handling system for generating and communicating user ID and password pairs to be used to validate payment for access to each fee for access Internet web site, a provisioning system for registering one or more caller pays call numbers for each fee for access Internet web site and registering each provisioned number within or more intelligent network service switches to which the provisioned numbers would be routed, a public switched network for routing any user originated calls by a user who desires to access the one or more fee for access Internet web sites to both an automated voice response unit and a caller pays billing system via the one or more intelligent network service switches, the fee for access Internet web site providing a web-based communication to the user enabling user selection of the one or more service options and generating a user ID in accordance with the user selection, the user communicating the user ID to the access code handling system via the automated voice response unit and, a network switch initiating billing for the user selection via the caller pays service billing system, and the access code handling system generating an associated password according to the password assignment protocol, wherein the voice response unit further communicates to the user, in response to receipt of a session user ID, an associated password in accordance with the protocol for the registered fee for access Internet web site, and the access code handling system communicates the user ID, the password and the service option to the registered fee for access Internet web site, and a verification device for verifying the session user ID and password provided to the user and the user ID and password communicated to the fee for access Internet web site, whereby the fee for access Internet web site enabling access to web site content upon verification.

In accordance with another aspect, the present invention is directed to a method for utilizing an access code handling system to control a user's access to digital data provided by an on-line server over a data network, wherein a billing system separate from the on-line server charges the user for access to the digital data. The method comprising the steps of the user receiving from the on-line server a user ID code, the access code handling system receiving, from the billing system, a message indicating that the user has requested access to digital data via the user ID code, the access code handling system communicating a password associated with the user ID code to a voice response unit, the voice response unit communicating to the user the password, and the access code handling system providing, to the billing system, indication that the password has been communicated to the user, the billing system assigning appropriate charges to the user's telephone service provider account.

The present invention is directed to a method and system for collecting small access fees for one-time/limited time access to web sites by capitalizing on the capabilities afforded by the combination of 900-(caller pays) long distance telephone service, and Intelligent Network Services (INS) that implement the VRUs (Voice Response Units) for 800-(called party pays) service. The method as outlined below is simple and cost effective to implement.

A company desiring to operate an "fee for access" web site obtains a 900-number from a long distance carrier. As is well-known, this series of numbers provides billing of the cost of the long distance call, together with a surcharge to the telephone number that originates the call. The combined costs of such calls are then reported and collected on the telephone bill of the caller who originated them. From the amount collected, the long distance carrier consolidates collections, deducts a charge for the call and a portion of the surcharge, and passes all the rest of the money collected on to the 900-number subscriber.

In accordance with the present invention, the long distance carrier then sets up routing of that particular 900-number through an INS VRU module that is capable of receiving digits dialed from a telephone and producing a voice response. The 900-number VRU module is also supplemented with an interface to an access code handling system that: (a) can automatically maintain a data base comprising a set of x-digit codes representing user identification numbers, and associated y-character alphanumeric codes representing the assigned passwords for active users; and (b) can effect data transfer to the host system for the "fee for access" web site, to update the host copy of that data base, or receive and validate an x-digit/y-character pair sent from the host web site.

When individuals log into the web site, they are informed via displays on the home page that the site is an "fee for access site", and further access will cost z cents. When the individuals assent to that charge, they are further informed that their user identification number is x, and that they are to call the 900-number to obtain a password for access to the web site.

When the call to the 900-number is placed, it is answered by a voice response unit that instructs the caller to enter the x-digit number just obtained from the web site. The number is entered by dialing it, in the same way, for example, as credit card numbers are entered in response to voice recordings.

Upon receipt of the x-digit number and verification that it is valid for use, the access code handling system generates a y-character password that is automatically transmitted back to the web site host, or alternately has been transmitted earlier to a web site data base, for checking by the web site host. The y-character password is then played by the VRU, and thereby conveyed orally to the caller seeking the password.

The individual desiring access to the "fee for access" web site has then paid for, and may use, the combination of the x-digit identification number obtained from the web site and the y-character password obtained from the 900-call to the VRU to log onto the web site.

Each log-on with that x-digit/y-character pair can then be monitored with commonly used password protection software until the agreed term of the admission to the web site (as defined, e.g., by the number of log-ons allowed with a particular combination or date of expiration) has expired, at which time the x-digit/y-character combination is invalidated.

The call handling systems for 900-calls and effecting the VRUs are both fully in place in the networks of major long distance carriers like MCI WorldCom. The system that should preferably be added to the existing INS capabilities to support the method just described comprises a software module, referred to here as an access code handling system, that interfaces with the VRU controller. This access code handling system preferably: (a) maintains a data base of user identification numbers and passwords for each of the different 900-numbers via which admission fees are collected for "fee for access" web sites; (b) receives communications from the VRUs identifying which x-digit codes need passwords; (c) communicates the associated y-character passwords to the VRUs for generation of the voice announcements; and (d) effects data communications between itself and the "fee for access" web site host systems supported to either automatically update a host-resident data base of active x-digit/y-character pairs, or respond to calls from the host systems for log-on verification.

The system and method of the present invention provide for rapid payment and access to pay to view Web sites. No credit card, charge card or debit card access is required and individuals do not have to sign up for extended subscription periods.

BRIEF DESCRIPTION OF THE DRAWINGS

The foregoing and other features and advantages of the present invention will be apparent from the following, more particular description of preferred embodiments of the invention, as illustrated in the accompanying drawings. In the drawings, like reference numbers indicate identical or functionally similar elements.

DETAILED DESCRIPTION OF THE PREFERRED EMBODIMENTS

Certain web sites require an admission fee. Essentially, these web sites require an individual desiring to browse the site to pay to view. When an individual accesses a pay to view web site, he or she is typically directed to a registration area. There the individual is required to answer various questions and to provide a charge or credit card number so that the registration fee may be automatically charged thereto. As explained above, there are drawbacks to this type of system. Accordingly, the individual or organization to which the web site belongs may provide a system whereby visitors to a pay to view web site can pay each time they access the site, or alternately, a system whereby single view or infrequent visitors can pay each time they access the site and frequent visitors can pay as described above.

An organization that owns or provides a pay to view web site applies for a caller pays number from a long distance carrier, such as MCI WorldCom. When an individual accesses a pay to view web site, he or she is given an identification code and instructions to call the caller pays number. At this point, the individual desiring access has not yet paid for anything. When the individual calls the caller pays number, a voice response unit prompts the caller for his/her identification code which is verified and correlated to a password by an access code handling system. The voice response unit provides a user password, supplied by the access code handling system, to the caller and terminates the call. Armed with the identification code and the password, the individual goes back to the web site and enters the code/password combination which was automatically activated via the caller pays call.

The owner/provider of the web site receives remuneration for access to the web site via the caller pays call and the individual seeking access to the web site is charged for access via his/her normal telephone bill. In addition, the long distance carrier providing the caller pays service also receives remuneration for the telephone call.

The duration of web site access based on the caller pays call may vary, and various prompts by the voice response unit may provide number of access options.

Figure 1:
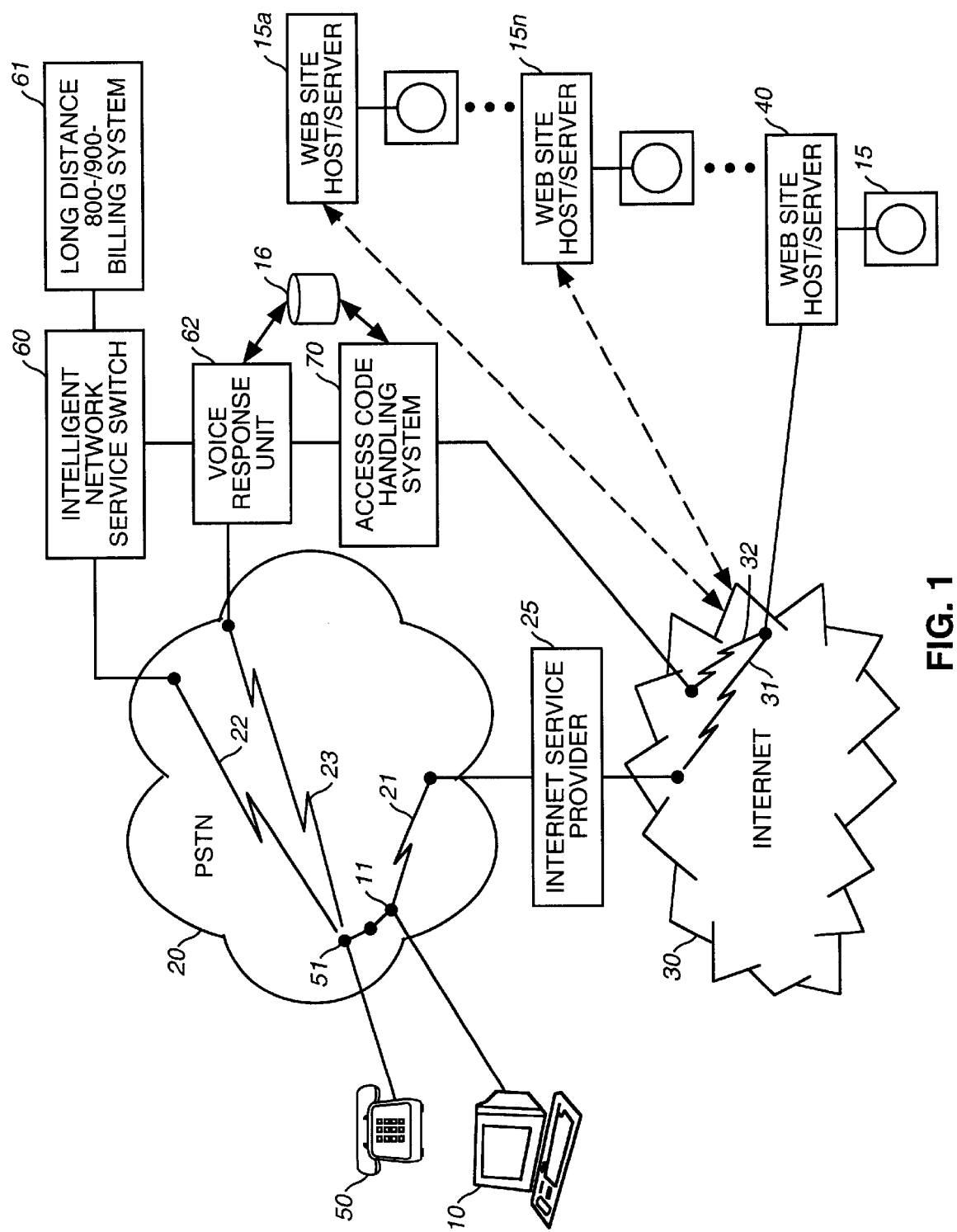
FIG. 1 is a diagrammatic representation of the system of the present invention illustrating the relationship between the PSTN, the 900-service infrastructure and a fee for access Internet web site using the method of the present invention for the collection of fees.

As illustrated in FIG. 1, a non-subscribed visitor to a web site 15 utilizes a conventional personal computer 10 to seize a local line 11 into the Public Switched Telephone Network (PSTN) 20, which sets up end-to-end telephone calls. The PSTN 20, then sets up a telephone connection 21, to the Internet Service Provider 25 used by the caller. The Internet Service Provider then takes the telephone signals received from the computer 10 via the telephone circuit 21 and converts the data they carry into the form and addressing used by the packet-switched data network 30, commonly referred to as the Internet. Converted data from the Internet Service Provider is then forwarded to the host/server 40 for the destination web site 15. As shown in FIG. 1, it is understood that multiple "fee for access" web site host systems 15a, . . . , 15n may be supported by the present invention.

When the non-subscribed visitor connects to the web site 15 via the routes shown and communicates via the computer 10 a desire and willingness to pay for access, the web site communicates to the computer a user identification code, together with instructions as to how to obtain the password associated with that user identification code, generated and maintained in an access code handling system 70. The instructions communicated to the computer 10 include a 900-(caller pays) number to be called to obtain the corresponding password.

The non-subscribed visitor then goes to an ordinary push-button telephone 50 and seizes a local line 51, which may also be the line 11, used earlier by the computer 10, to place the 900-service call through the PSTN 20 to a long distance carrier Intelligent Network Switch (INS) 60. Until and unless that call is placed there is absolutely no charge to the visitor for having attempted to browse the web site 15.

When the PSTN 20 connection to the INS is effected via the circuit 22, the INS 60 passes information to the long-distance 800-/900-billing system 61 as to how the call is to be charged and switches the connection from the telephone 50 to a second circuit 23 connecting the telephone with the Voice Response Unit (VRU) 62. It is understood that conventional 900-number provisioning techniques may be implemented for enabling intelligent network switches to route the 900-number call with the appropriate associated automated voice response unit message. The VRU 62 then communicates over the telephone connection 23 the voice prompts and instructions for requesting an access password for the web site 15. Included among those instructions is a prompt for the caller to enter via the telephone 50 key pad the user identification number received by the computer 10 from the Web site 15 via the Internet 30 PSTN 20 connections 31 and 21, respectively. Upon receipt and verification of the kind of access sought and the necessary user identification number, the VRU 62 communicates any necessary ancillary billing information to the long distance 800-/900-billing system 61 and communicates the user identification number to the access code handling system 70.

Either at the time of the receipt of the message comprising the user identification number, or earlier, in anticipation of a user of that identification number, the access code handling system communicates the identification number/password pair to the web site 15 via an Internet connection 32 and the Web site host/server 40. When contacted by the VRU 62 maintaining the connection to the telephone 50, the access handling system 70, communicates the password associated with the user identification number to the VRU 62, which generates a voice message back to the caller's telephone 50 via PSTN 20 circuit 23. Once the necessary information is communicated by the VRU 62, the PSTN 20 circuit 23 connecting the VRU 62 and the telephone 50 is disconnected, allowing its use for other purposes, including originating of data calls via the computer 10.

The non-subscribed user then uses the computer 10 to communicate via a PSTN 20 circuit 21 to the Internet Service Provider 25, and an Internet 30 circuit 31 via the web site host/server 40 to the web site 15. In the exchanges between the web site 15 and the computer 10, the user is prompted to enter the user identification number obtained from the web site 15 and password obtained from the Access Code Handling System 70 via the Voice Response Unit 62. The matched pair is checked by the web site 15 against valid access code information received from the Access Code Handling System 70. Verification that the two parts match and the user has not exhausted the number/period of accesses associated with the matched user identification/password pair allows the caller to browse the web site 15 from the computer 10, or any other computer capable of communicating through the Internet 30.

It should be understood that the present invention includes a software module, embodied in the access code handling system, interfacing the VRU controller that: 1) maintains a database 16 (FIG. 1) including the user identification numbers and passwords for each of the different provisioned 900-numbers via which admission fees are collected for the "fee for access" web site; 2) receives communications from the VRUs identifying which x-digit codes need passwords; 3) communicates the associated y-character passwords to the VRUs for generation of the voice announcements; and 4)

effects data communications between itself and the "fee for access" web site host systems supported to either: automatically update a host-resident database of active x-digit/y-character pairs, or respond to calls from the host systems for log-on verification.

Figure 2A:
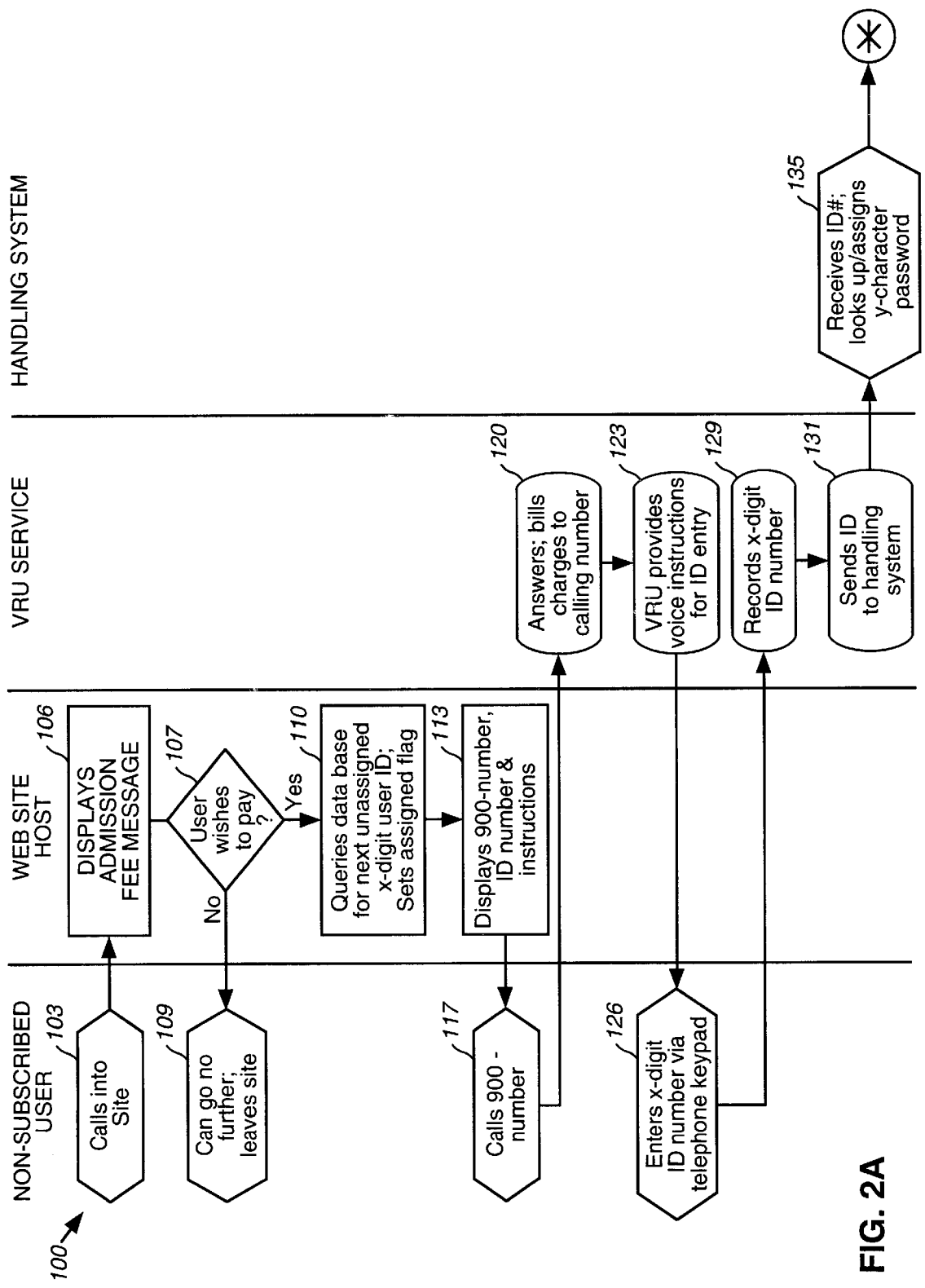
FIG. 2a is sheet 1 of a 2 sheet flow chart illustrating the method for using 900 service for single use and short term access to fee for access internet web sites in accordance with the present invention.
Figure 2B:
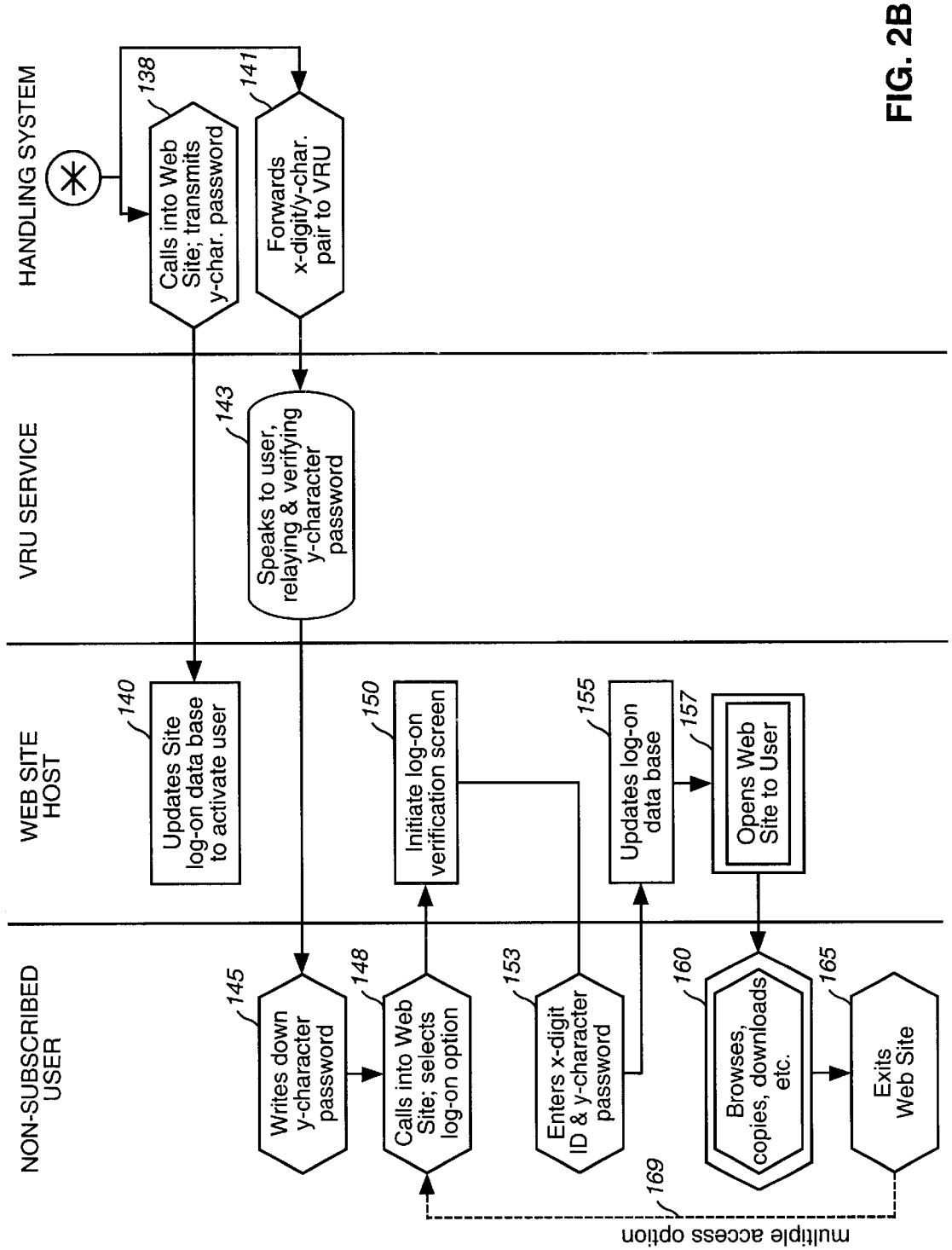
FIG. 2b is sheet 2 of a 2 sheet flow chart illustrating the method for using 900 service for single use and short term access to fee for access internet web sites in accordance with the present invention.

A preferred methodology 100 for providing a non-subscribed user single and short term access to Internet web-sites is now provided in view of FIGS. 2(a) and 2(b).

In FIG. 2(a), as indicated at a first step 103, a user accesses the desired web site. In response, at step 106, a message is displayed on the web site home page informing the user that the site is an "fee for access" site, and may include an admission fee schedule for single-use or limited short term access. For example, a display may indicate single-use access may cost z cents. At this point, the user may agree to the displayed charges at step 107, or leave the web site as indicated at step 109. If the user decides to pay for web site access, the web site host queries a data base (not shown) at step 110 to retrieve an unassigned x-digit user ID number. The user is then informed that their user identification number is x, and that they are to call the 900-number to obtain a password. Additionally, a flag stored in memory and associated with that number is set to indicate that the user ID number is assigned. Then, at step 113, a web page communication is displayed at the user terminal indicating the 1-900 number, the assigned ID number and instructions enabling the user to proceed to access the associated billing system. As instructed, at step 117, the user dials the 1-900 number via a standard telephone. When the call to the 900-number is placed, it is answered by a voice response unit at step 120 that instructs the caller at step 123, to enter the x-digit user ID number just obtained from the web site. It is understood that the system also bills charges to the calling number in accordance with the long-distance 800-/900-billing system implemented. The user then enters the assigned ID number by dialing it, in the same way, for example, as credit card numbers are entered in response to voice recordings, i.e., via a telephone keypad, as indicated at step 126. Then, at step 129, the VRU system records the entered x-digit user ID number and, at step 131 communicates the x-digit user ID number to the access code handling system as described herein with respect to FIG. 1. As indicated at step 135 and step 138 (FIG. 2(b)), upon receipt of the x-digit number and verification that it is valid for use, the access code handling system generates or retrieves a y-character password that is or had earlier been automatically transmitted back to the web site host along with the corresponding x-digit ID number, where the x-digit/y-character pair is stored in the web site host for purposes of validating accesses.

Concurrently, as indicated at step 141, the y-character password is transmitted to the VRU and conveyed orally to the caller seeking to use it, as indicated at step 143. The non-subscribed user desiring access to the "fee for use" web site which has been paid for in accordance with a protocol for the now requested ID code/password pair, may use the combination of the x-digit identification number obtained from the web site and the y-character password obtained from the 900-call from the VRU to log onto the web site, as indicated at steps 145, 148 and 150. Particularly, at step 153, the non-subscribed user enters his/her x-digit identification number and y-character password pair via the user's terminal and is admitted to the web site at steps 155, 157. The user is subsequently able to browse, copy and/or download content from the web site as indicated at step 160. If only single-use access was paid for, once the user exits the site, at step 165, he/she may no longer access the site unless the user ID assignment process described herein is repeated. However, if the multiple access option was paid for, the user may subsequently re-enter and log into the web site by returning, as indicated by line 169, to the web site log in step 153.

The y-character password and the x-digit user ID number may be any suitable length and may comprise any combination of alpha-numeric characters. For security reasons, the length of the password may be longer than the length of the ID number.

Although shown and described is what are believed to be the most practical and preferred embodiments, it is apparent that departures from specific methods and designs described and shown will suggest themselves to those skilled in the art and may be used without departing from the spirit and scope of the invention. The present invention is not restricted to the particular constructions described and illustrated, but should be construed to cohere with all modification that may fall within the scope of the appended claims.

What is claimed is:

1. A method for using an existing caller pays service telecommunications infrastructure to provide single use and short term access to fee for access Internet web sites, the method comprising:

(a) registering one or more fee for access Internet web sites with an access code handling system to generate and communicate session user ID and password pairs to be used to access each fee for access Internet web site;

(b) provisioning one or more caller pays numbers for each registered fee for access Internet web site, and registering each provisioned number with one or more intelligent network service switches to which the provisioned numbers would be routed;

(c) routing any user originated calls by a user who desires to access the one or more fee for access Internet sites to both an automated voice response unit and a caller pays service for billing system;

(d) providing the user with a session user ID via a display generated by the fee for access Internet web site;

(e) communicating to the user via the caller pays telecommunications infrastructure a password associated with the session user ID and service option for the registered fee for access Internet web site via the automated voice response unit; and (f) billing the user for the service option with the caller pays service billing network.

2. The method as claimed in claim 1, further including the steps of:

accessing the registered fee for access Internet web site via a user terminal;

in response to the accessing, displaying a web page indicating user-selectable options including single use and short term access and fees associated therewith at the user terminal; and enabling user selection of the single use and short term access options to the fee for access Internet web site.

3. The method as claimed in claim 2, wherein the step of providing the user with a session user ID includes querying a database comprising unused session ID numbers and retrieving a session user ID in response to the user's service option selection for communication to the user.

4. The method as claimed in claim 2, wherein the step of providing the user with a session user ID further includes communicating a caller pays call number to the user via the user terminal, the user dialing the caller pays call number and entering the session user ID to the automated voice response unit via a telephone keypad.

5. The method as claimed in claim 4, wherein the step of providing the user with a session user ID further includes accessing the access code handling system for generating password associated with the session user ID and relaying the password to the user via the automated voice response unit.

6. The method as claimed in claim 5, wherein the access code handling system further transmits the session user ID and password combination to the registered fee for access Internet web site via the Internet.

7. The method as claimed in claim 6, further comprising initiating display of a user login display prompting user entry of the session user ID and the password, in response to the step of communicating a password associated with the session user ID and service option.

8. The method as claimed in claim 7, further comprising verifying the entered session user ID and the password via the logon display against valid user ID and password combination transmitted by the code handling system, after the step of communicating a password associated with the session user ID and service option.

9. The method as claimed in claim 4, wherein the step of dialing the caller pays call number comprises initiating communication with the caller pays service billing network, via an intelligent network services switch, for initiating a charge for the call, the automated voice response unit further communicating information related to the session user ID to enable billing by the caller pays service billing network.

10. A system for implementing an existing caller pays telecommunications infrastructure to provide single use and short term access to fee for access Internet web sites, the system comprising:

(a) an access code handling system for generating and communicating user ID and password pairs to be used to validate payment for access to each fee for access Internet web site;

(b) a provisioning system for registering one or more caller pays call numbers for each fee access Internet web site and registering each provisioned number within one or more intelligent network service switches to which the provisioned numbers would be routed;

(c) a public switched network for routing any user originated calls by a user who desires to access the one or more fee for access Internet web sites to both an automated voice response unit and a caller pays billing system via the one or more intelligent network service switches;

(d) the fee for access Internet web site providing a web-based communication to the user enabling user selection of the one or more service options and generating a session user ID in accordance with the user selection, the user communicating the user ID to the access code handling system via the automated voice response unit and, a network switch initiating billing for the user selection via the caller pays service billing system, and the access code handling system generating an associated password according to a password assignment protocol;

wherein the automated voice response unit further communicates to the user, in response to receipt of a session user ID, an associated password in accordance with the password assignment protocol for the registered fee for access Internet web site, and the access code handling system communicated the user ID, the password and the service option to the registered fee for access Internet web site; and, (e) a verification device for verifying the session user ID and password provided to the user and the session user ID and password communicated to the fee for access Internet web site, whereby the fee for access Internet web site enabling access to web site content upon verification.

11. A method for utilizing an access code handling system to control a user's access to digital data provided by an on-line server over a data network, wherein a billing system separate from the on-line server charges the user for access to the digital data, the method comprising the steps of:

the user receiving from the on-line server a user ID code;

the access code handling system receiving, from the billing system, a message indicating that the user has requested access to digital data via the user ID code;

the access code handling system communicating a password associated with the user ID code to a voice response unit, the voice response unit communicating to the user the password; and the access code handling system providing, to the billing system, indication that the password has been communicated to the user, the billing system assigning appropriate charges to the user's telephone service provider account.

* * * * *